(12) United States Patent
Sakata

(10) Patent No.: US 10,402,936 B2
(45) Date of Patent: Sep. 3, 2019

(54) INFORMATION PROCESSING APPARATUS, IMAGE FORMING SYSTEM, AND INFORMATION PROCESSING METHOD RELATING TO AN IMAGE COMPRESSION

(71) Applicant: CANON KABUSHIKI KAISHA, Tokyo (JP)

(72) Inventor: Munetaka Sakata, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/877,163

(22) Filed: Oct. 7, 2015

(65) Prior Publication Data
US 2016/0112718 A1 Apr. 21, 2016

(30) Foreign Application Priority Data

Oct. 16, 2014 (JP) .................. 2014-211748

(51) Int. Cl.
*G06T 1/60* (2006.01)
*H04N 19/172* (2014.01)
(Continued)

(52) U.S. Cl.
CPC .................. *G06T 1/60* (2013.01); *G06F 3/12* (2013.01); *G06F 3/122* (2013.01); *G06F 3/1247* (2013.01); *G06F 3/1288* (2013.01); *G06K 15/181* (2013.01); *G06K 15/1807* (2013.01); *H04N 19/12* (2014.11); *H04N 19/15* (2014.11); *H04N 19/172* (2014.11); *G06F 3/121* (2013.01); *H04N 19/61* (2014.11)

(58) Field of Classification Search
CPC ...... H04N 19/172; H04N 19/15; H04N 19/61; H04N 19/12; H04N 19/593; G06K 15/181; G06K 15/1807; G06T 1/60; G06F 3/12
See application file for complete search history.

(56) References Cited

U.S. PATENT DOCUMENTS 6,181,435 B1  1/2001  Onodera
7,894,679 B2  2/2011  Nagarajan et al.
(Continued)

FOREIGN PATENT DOCUMENTS

CN  101131626 A  2/2008
CN  101641682 A  2/2010
(Continued)

OTHER PUBLICATIONS

Office Action issued in Chinese Appln. No. 201510662603.2 dated Nov. 24, 2017. English translation provided.

*Primary Examiner* — Yon J Couso
(74) *Attorney, Agent, or Firm* — Rossi, Kimms & McDowell LLP

(57) ABSTRACT

An information processing apparatus having a compression unit configured to compress image data and to store compressed image data in a storage unit, a determination unit configured to determine a compression method on a basis of a data size of the compressed image data stored in the storage unit, a decompression unit configured to decompress the compressed image data stored in the storage unit, and a transmission unit configured to transmit image data decompressed by the decompression unit and information on the determined compression method to an image forming apparatus.

4 Claims, 14 Drawing Sheets

(51) Int. Cl.
*H04N 19/15* (2014.01)
*H04N 19/12* (2014.01)
*G06F 3/12* (2006.01)
*G06K 15/02* (2006.01)
*H04N 19/61* (2014.01)

(56) References Cited

U.S. PATENT DOCUMENTS

| | | | |
|---|---|---|---|
| 8,060,659 B2 | 11/2011 | Ichieda | |
| 9,141,632 B1* | 9/2015 | Ramesh | G06F 17/30091 |
| 2003/0118242 A1* | 6/2003 | Nakayama | H03M 7/46 |
| | | | 382/245 |
| 2004/0095601 A1* | 5/2004 | Ozawa | H04N 1/41 |
| | | | 358/1.15 |
| 2006/0044601 A1* | 3/2006 | Misawa | G06F 3/122 |
| | | | 358/1.15 |
| 2007/0076966 A1* | 4/2007 | Lee | H04N 1/41 |
| | | | 382/239 |
| 2009/0310857 A1* | 12/2009 | Sung | H04N 19/60 |
| | | | 382/166 |
| 2010/0095108 A1 | 4/2010 | Kameyama et al. | |
| 2010/0329548 A1* | 12/2010 | Yoshimura | H04N 1/00278 |
| | | | 382/164 |
| 2011/0167173 A1* | 7/2011 | Bansal | H03M 7/30 |
| | | | 709/247 |
| 2012/0281757 A1* | 11/2012 | Roncero Izquierdo | |
| | | | H04N 19/159 |
| | | | 375/240.13 |
| 2012/0288211 A1* | 11/2012 | Hitosugi | G06T 9/00 |
| | | | 382/244 |
| 2013/0342550 A1 | 12/2013 | Yang et al. | |

FOREIGN PATENT DOCUMENTS

| | | |
|---|---|---|
| CN | 103514920 A | 1/2014 |
| EP | 0817111 A3 | 10/2002 |
| JP | 2007013956 A | 1/2007 |

\* cited by examiner

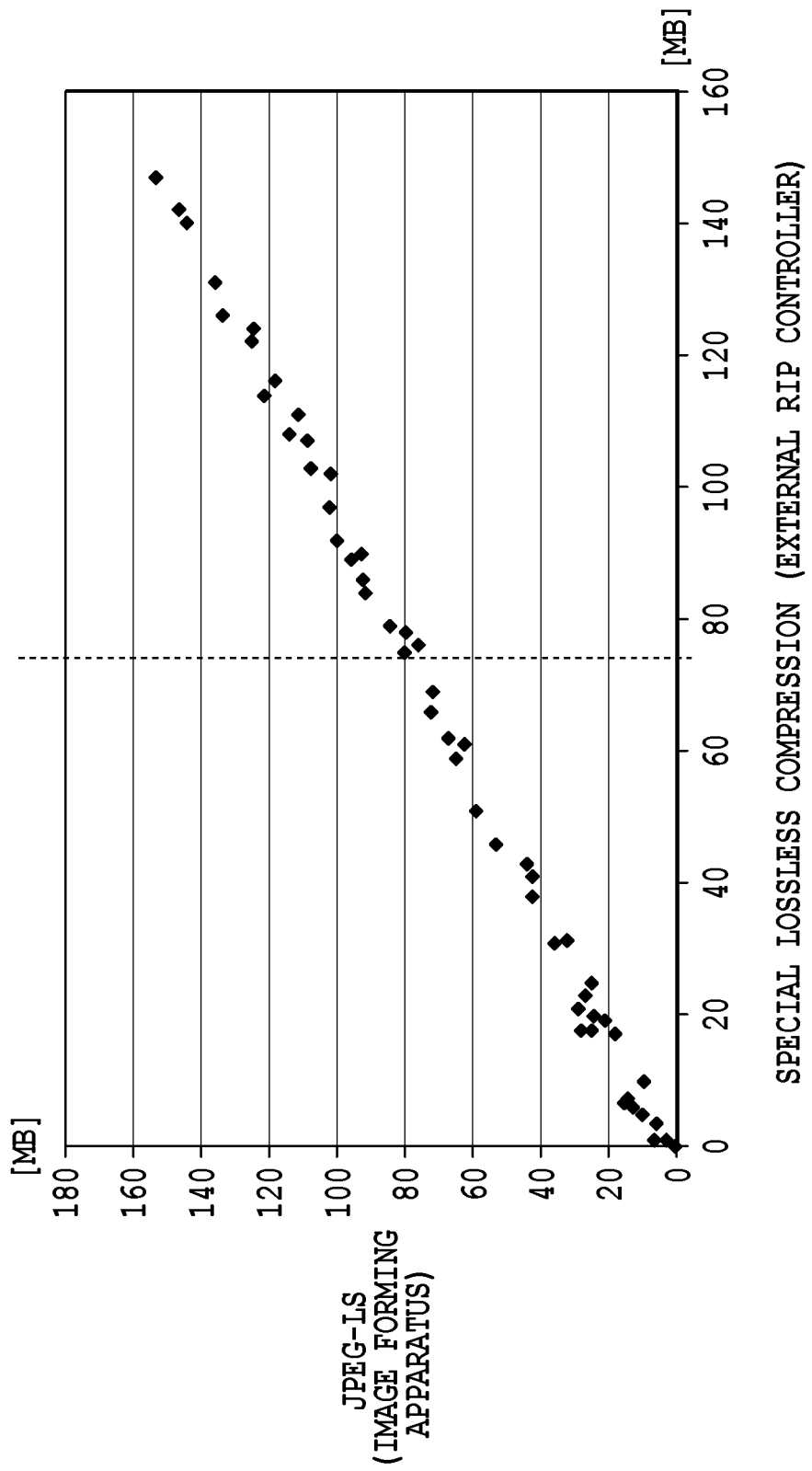

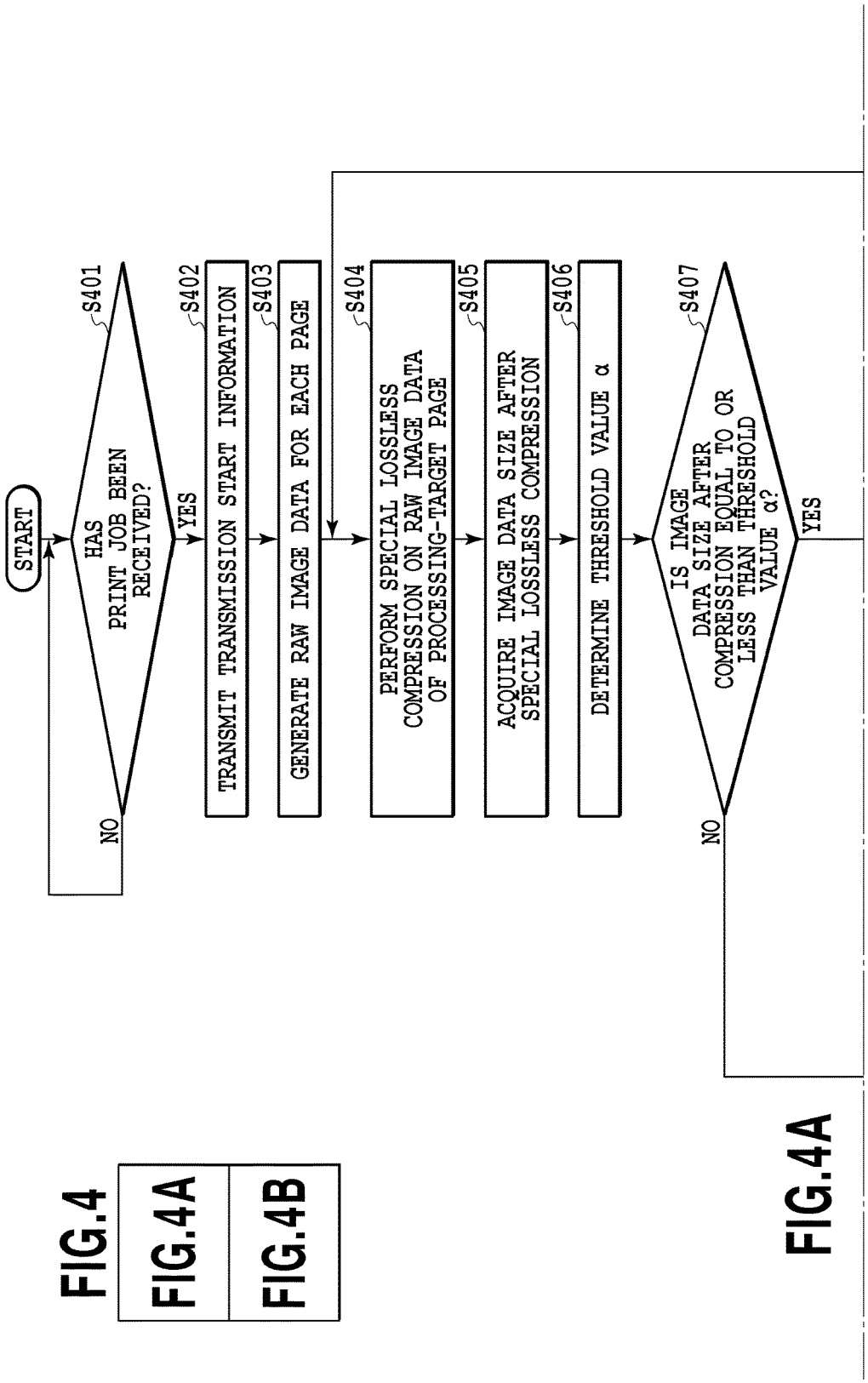

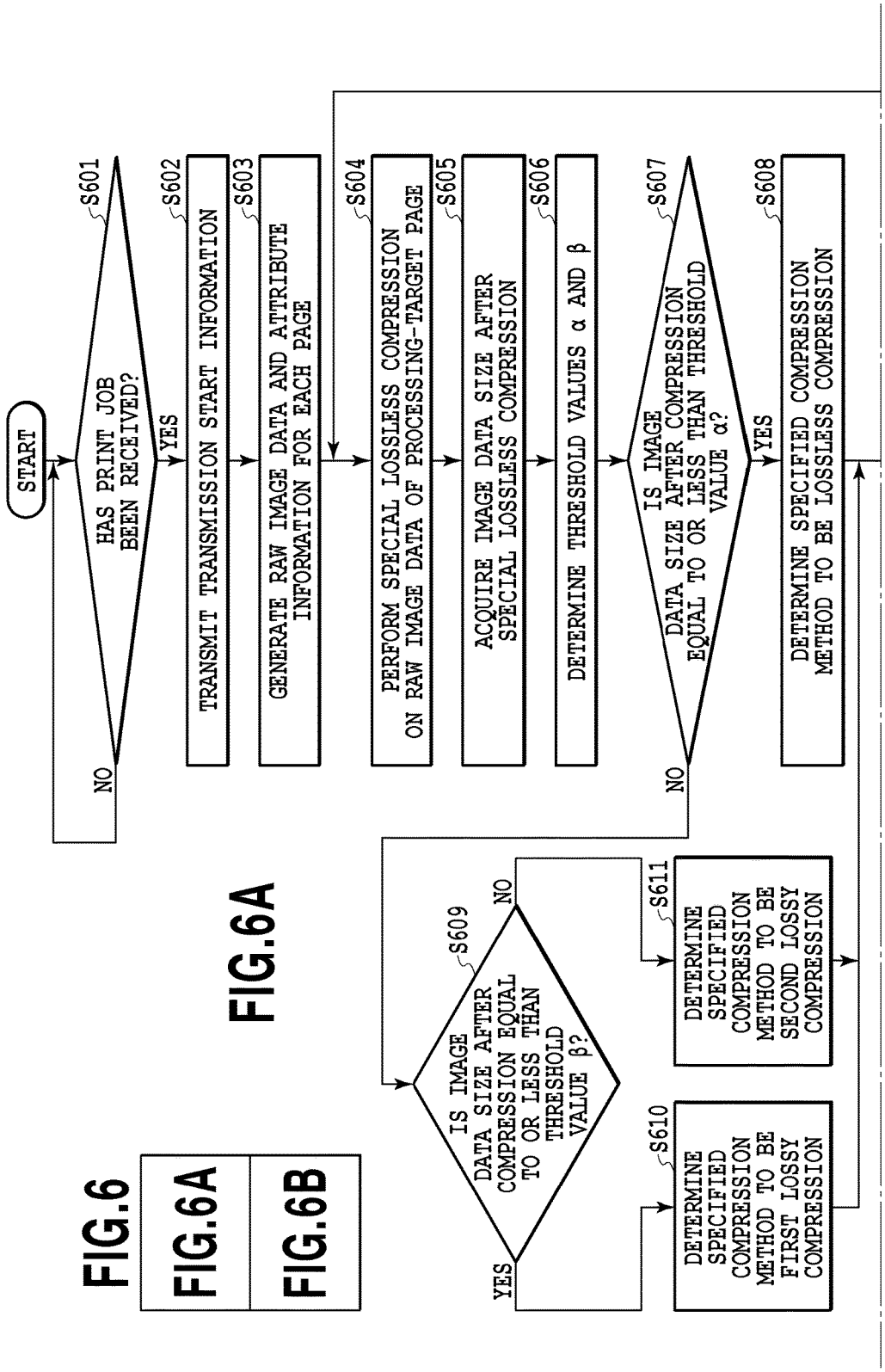

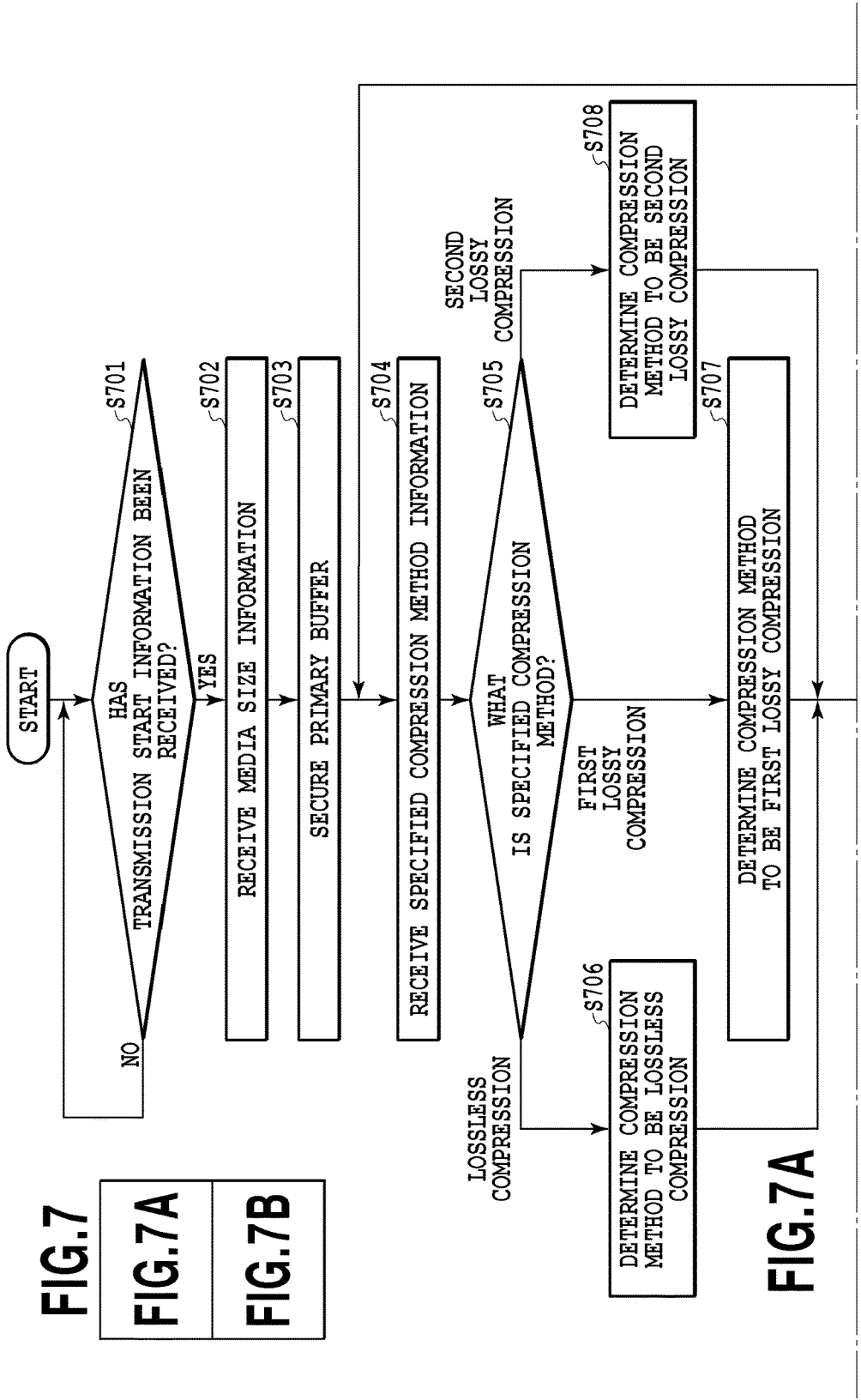

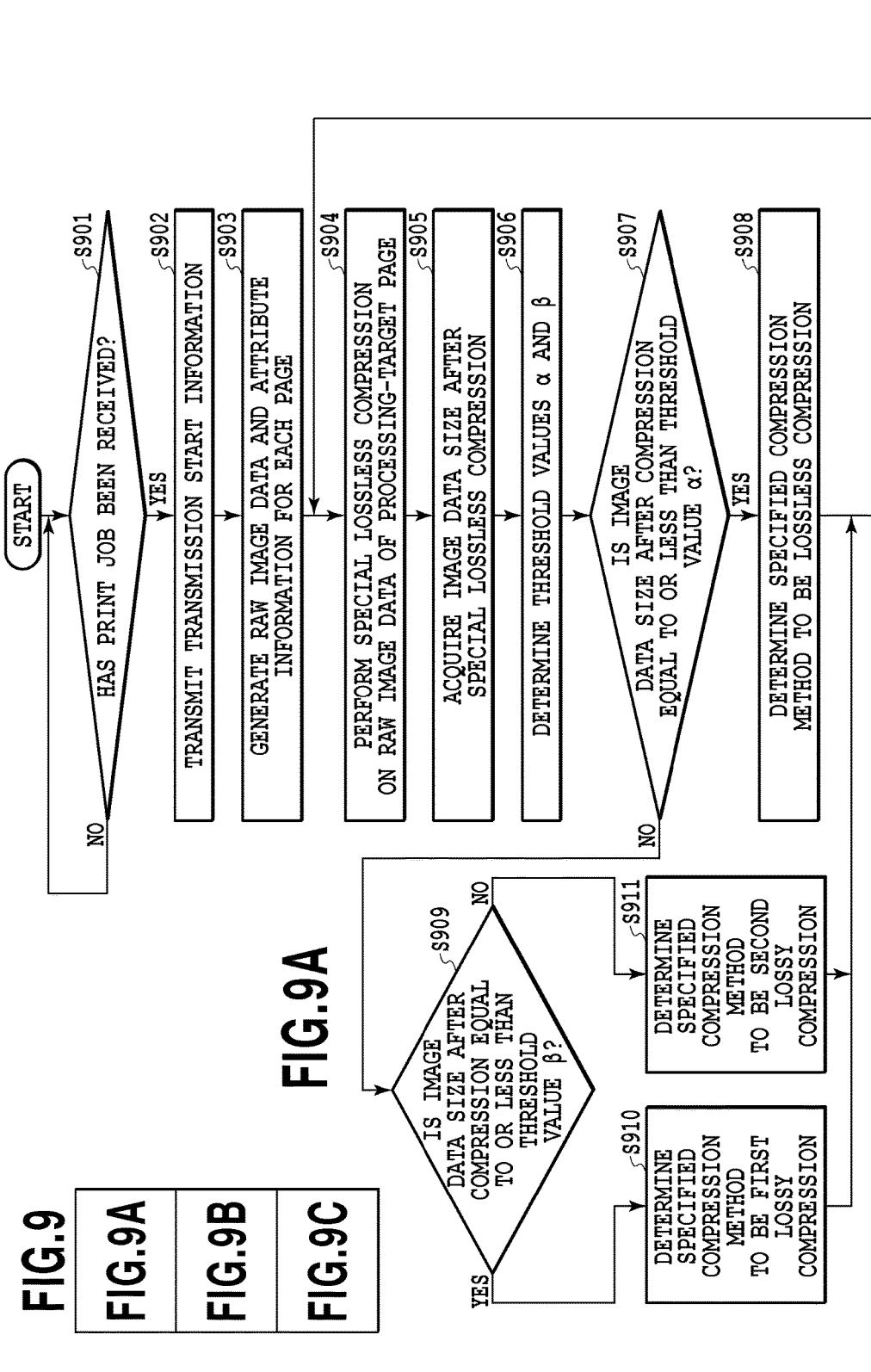

INFORMATION PROCESSING APPARATUS, IMAGE FORMING SYSTEM, AND INFORMATION PROCESSING METHOD RELATING TO AN IMAGE COMPRESSION

BACKGROUND OF THE INVENTION

Field of the Invention

The present invention relates to a technique to predict a compression method at a transfer destination in the case where image data is transferred between apparatuses.

Description of the Related Art

In recent years, in the field of production printing in which a large amount of printed matter is formed, the number of cases is increasing where a configuration is adopted in which a RIP controller (information processing apparatus specialized in the RIP function. Hereinafter, referred to as an "external RIP controller") is connected externally to an image forming apparatus, such as a digital multifunction peripheral. In such a configuration, the external RIP controller is in charge of generating print image data by performing rasterization on electronic data and the image forming apparatus is in charge of receiving and printing the print image data.

FIG. 1A is a diagram explaining an outline of image processing for print image data in a production printing system including an external RIP controller and an image forming apparatus. The external RIP controller having received electronic data to be printed generates RAW image data by performing rasterization and then performs lossless compression in order to compress the image size while maintaining image quality. Then, the external RIP controller transmits RAW image data obtained by decompressing the lossless-compressed image data to the image forming apparatus at timing at which a user gives instructions to perform printing. The image forming apparatus performs lossless compression on the received RAW image data and stores the RAW image data in a primary buffer on a memory. Then, the image forming apparatus decompresses the lossless-compressed image data and performs printing.

However, normally, the amount of memory that the image forming apparatus has is smaller than the amount of memory that the external RIP controller has. Because of this, it may happen that it is not possible for the image forming apparatus to store the received RAW image data in the primary buffer.

FIG. 1B is a diagram explaining an outline of processing in the case where the RAW image data received from the external RIP controller cannot be stored in the primary buffer within the image forming apparatus. In the case where the image forming apparatus determines that it is not possible to store the RAW image data in the primary buffer even by performing compression (lossless compression), the image forming apparatus requests the external RIP controller to retransmit the same RAW image data. Upon receipt of the request, the external RIP controller transmits the same RAW image data again to the image forming apparatus. Then, the image forming apparatus applies lossy compression with a high compression ratio at this time to the RAW image data that is received again to reduce the size of the image after the compression. By doing so, it is made possible for the image forming apparatus to store the image data in the primary buffer.

By using the method in FIG. 1B, it is made possible even for the image forming apparatus having a small amount of memory to receive and store the RAW image data that is transmitted from the external RIP controller within the memory. However, with this method, the external RIP controller needs to perform processing to retransmit the same RAW image data and the image forming apparatus needs to compress the RAW image data again by using a method with a high compression ratio, and therefore, the start of printing is delayed by an amount of time corresponding to the time taken for the processing.

In relation to this point, for example, Japanese Patent Laid-Open No. 2007-013956 has disclosed a technique to predict the image data size while scanning a document with a scan apparatus at the time of storing the image data from the scan apparatus to a target apparatus. Specifically, by the scan apparatus transmitting the predicted image data size at all times to the target apparatus that is connected via a network, whether or not the image data can be stored in an empty area of the target apparatus is determined. By applying the method of Japanese Patent Laid-Open No. 2007-013956 to the above-described production printing system, it is possible to determine in advance whether the image data after compression can be stored in the target apparatus (image forming apparatus) connected via a network.

However, Japanese Patent Laid-Open No. 2007-013956 has not presented a method for dealing with the case where it is determined that the image data after compression cannot be stored in an empty area of the target apparatus, and after all, it is not possible to solve the problem of retransmission of the same image data described above.

SUMMARY OF THE INVENTION

An information processing apparatus according to the present invention includes: a compression unit configured to compress image data and to store compressed image data in a storage unit; a determination unit configured to determine a compression method on a basis of a data size of the compressed image data stored in the storage unit; a decompression unit configured to decompress the compressed image data stored in the storage unit; and a transmission unit configured to transmit image data decompressed by the decompression unit and information on the determined compression method to an image forming apparatus.

Further features of the present invention will become apparent from the following description of exemplary embodiments (with reference to the attached drawings).

BRIEF DESCRIPTION OF THE DRAWINGS

FIG. 3 is a graph representing a correlation between the size of image data on which special lossless compression has been performed and that of image data on which JPEG-LS compression has been performed;

FIG. 4 is a diagram showing a relationship of FIGS. 4A and 4B;

FIGS. 4A and 4B are flowcharts showing a flow of processing in an external RIP controller according to a first embodiment;

FIG. 6 is a diagram showing a relationship of FIGS. 6A and 6B;

FIGS. 6A and 6B are flowcharts showing a flow of processing in an external RIP controller according to a second embodiment;

FIG. 7 is a diagram showing a relationship of FIGS. 7A and 7B;

FIGS. 7A and 7B are flowcharts showing a flow of processing in an image forming apparatus according to the second embodiment;

FIG. 9 is a diagram showing a relationship among FIGS. 9A to 9C, and FIGS. 9A to 9C are flowcharts showing a flow of processing in an external RIP controller according to a third embodiment.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically. The color space of an image in each embodiment is CMYK unless otherwise specified in particular.

[First Embodiment]

Figure 1A:
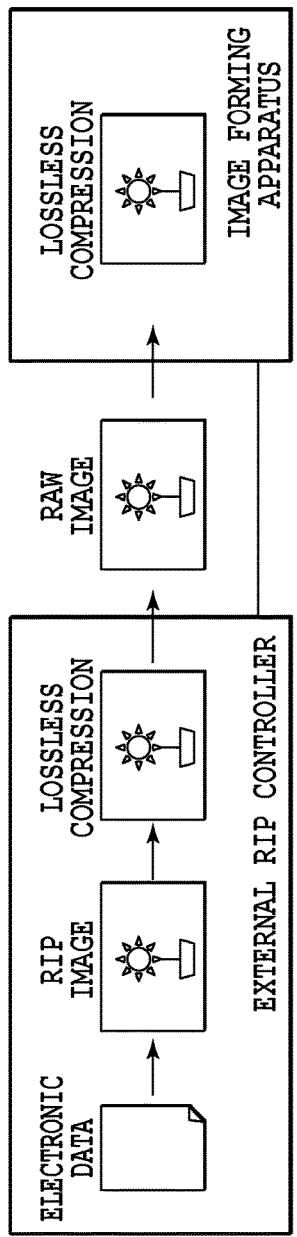
FIGS. 1A and 1B are diagrams explaining an outline of image processing for print image data in a production printing system of the prior art.
Figure 1B:
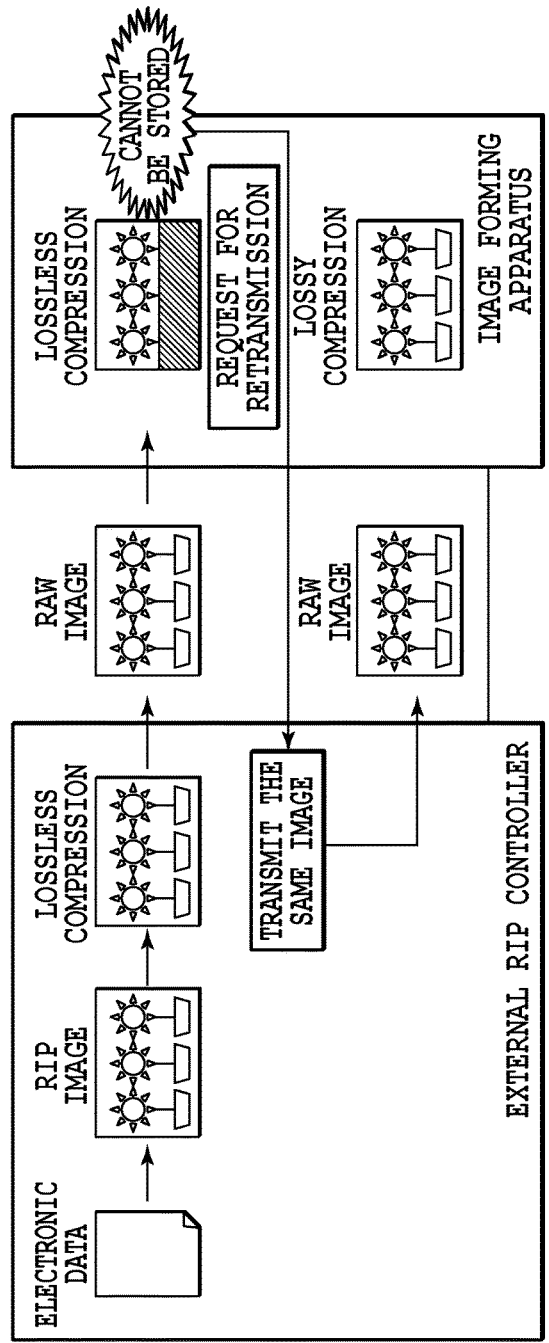
Figure 2:
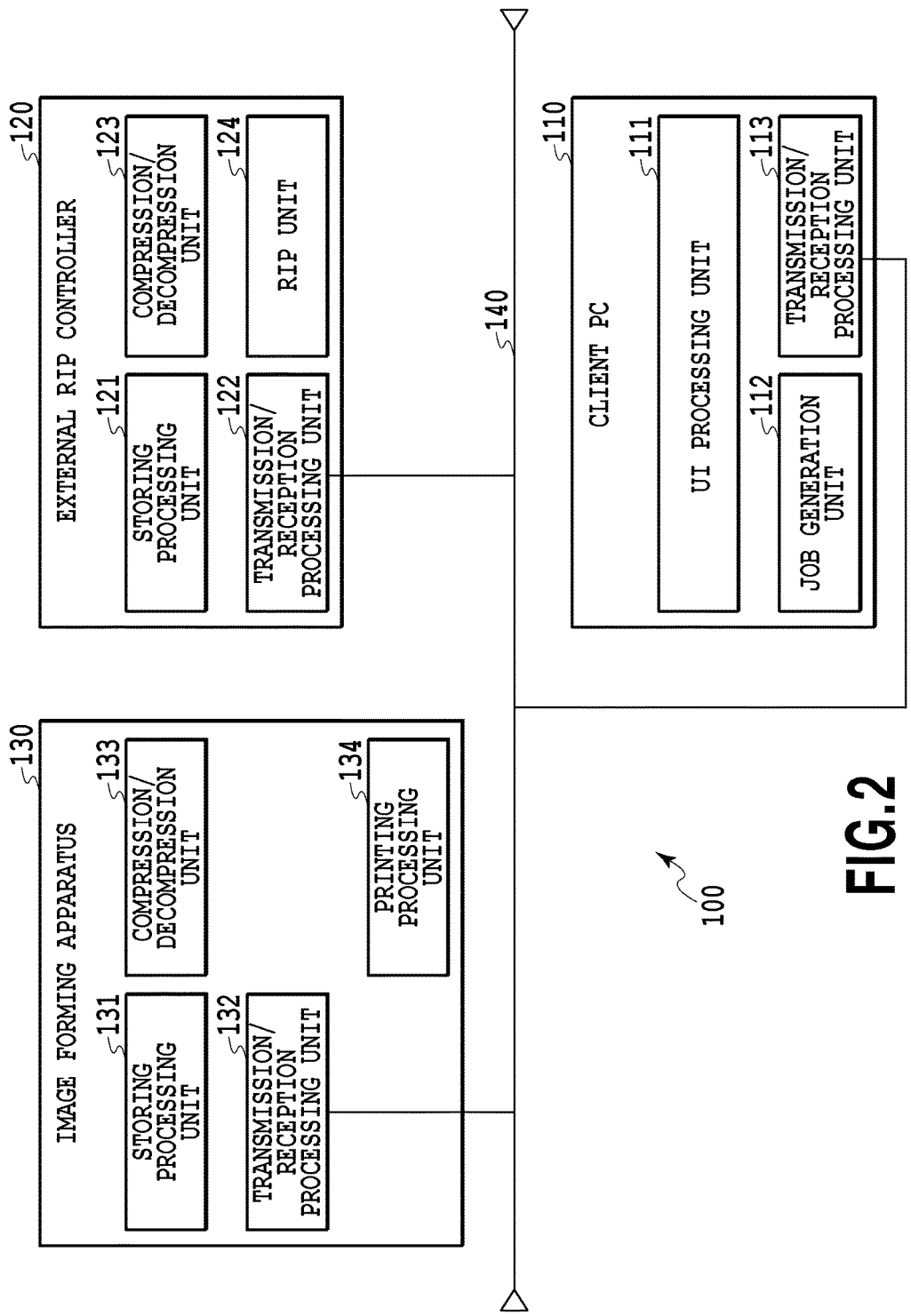
FIG. 2 is a block diagram showing an example of a configuration of a production printing system.

FIG. 2 is a block diagram showing an example of a configuration of a production printing system according to the present embodiment. A production printing system 100 includes a client PC 110, an external RIP controller 120, and an image forming apparatus 130 and these components are connected to one another via a network 140.

The client PC 110 is an information processing apparatus for which a user specifies a document (electronic data) to be printed and to which a user gives instructions to perform printing.

The external RIP controller 120 is an information processing apparatus that receives a print job from the client PC 110 and performs rasterization (processing to generate RAW image data). Here, the reason that no RIP unit is provided (or that the RIP unit is provided but not used) within the image forming apparatus 130 is the speed of the rasterization. In other words, it is common for the external RIP controller that is used in the production printing system to have a CPU whose speed is higher than that of the image forming apparatus and a RAM whose capacity is larger than that of the image forming apparatus, and therefore, the processing speed is by far higher compared to that of the image forming apparatus.

The image forming apparatus 130 is an apparatus that receives RAW image data from the external RIP controller 120 and performs printing processing.

In the following, a software module included in each apparatus in order to implement the above-described function is explained with reference to FIG. 2. Each of the client PC 110, the external RIP controller 120, and the image forming apparatus 130 has a main control unit (not shown) including a CPU, a ROM, a RAM, etc., for centralizedly controlling each apparatus. Then, in the ROM, a program corresponding to each software module is stored and by the CPU executing the program after developing the program onto the RAM, the function of each processing unit is implemented.

First, the software module of the image forming apparatus 130 is explained.

The image forming apparatus 130 includes a storing processing unit 131, a transmission/reception processing unit 132, a compression/decompression unit 133, and a printing processing unit 134.

The transmission/reception processing unit 132 performs processing to transmit/receive data to/from an external device, such as processing to receive RAW image data from the external RIP controller 120.

The compression/decompression unit 133 performs processing to compress the RAW image data received by the transmission/reception processing unit 132 by a predetermined compression method. As a CODEC for compressing RAW image data, there exists a plurality of kinds, but in the present embodiment, it is assumed that the compression/decompression unit 133 has each CODEC, i.e., JPEG-LS compression as lossless compression (reversible compression) and JPEG compression as lossy compression (irreversible compression). Further, the compression/decompression unit 133 also performs processing to decompress compressed image data stored in the primary buffer.

The storing processing unit 131 performs processing or the like to store image data compressed by a compression/decompression unit 133 in the primary buffer secured on the memory (storage unit).

The printing processing unit 134 performs processing to perform printing on a printing medium (e.g., sheet) by controlling a printing engine, not shown, in accordance with the image data decompressed by the compression/decompression unit 133.

Next, the software module of the external RIP controller 120 is explained. The external RIP controller 120 includes a storing processing unit 121, a transmission/reception processing unit 122, a compression/decompression unit 123, and a RIP unit 124.

The transmission/reception processing unit 122 performs processing to transmit/receive data to/from an external apparatus, such as processing to transmit RAW image data to the image forming apparatus 130.

The RIP unit 124 performs the rasterization on PDL data which is described by Page Description Language such as PostScript, received from the client PC 110.

The compression/decompression unit 123 performs processing to compress RAW image data generated by the RIP unit 124 by a predetermined compression method. The compression performed by the compression/decompression unit 123 is lossless compression, and it is assumed that in the present embodiment, the compression/decompression unit 123 has a CODEC to perform special compression (hereinafter, special lossless compression) based on JPEG-LS compression as its CODEC. Further, the compression/decompression unit 123 also performs processing to decompress the compressed image data stored in an HDD (not shown).

Here, the difference between the JPEG-LS compression and the special lossless compression based on JPEG-LS is explained. The JPEG-LS compression includes two phases: modeling and encoding. In modeling, a predicted error is calculated by nonlinear prediction and the predicted error is encoded by using the Golomb-Rice coding. The Golomb-Rice coding is a simplified encoding system that is utilized in the case where small integers, such as predicted errors, appear frequently. The special lossless compression is one of methods for increasing compression efficiency, i.e., a method for causing small integers to appear more frequently by improving the modeling in the JPEG-LS compression to reduce entropy. Normally, in the JPEG-LS compression, in the case where a RAW image of CMYK is compressed, a predicted error is calculated for each plane (color plane) of CMYK by using an MED (Median Edge Detector). On the other hand, in the special lossless compression based on JPEG-LS, a predicted error is calculated for four planes in total, i.e., a plane of a basic color and difference planes for the basic color (e.g., in the case where M is taken to be the basic color, four planes of C-M, M, Y-M, and K-M) by using the MED. This compression generally takes into consideration the characteristics that the values of each plane of CMYK have a correlation (in particular, in a pixel in which the gray component is high, the correlation is very high). In other words, while the predicted error is calculated for four planes of CMYK in the JPEG-LS compression, the predicted error is calculated for four planes of C-M, M, Y-M, and K-M in the special lossless compression. As described above, there is a correlation between the values of each plane of CMYK, and therefore, the entropy of the predicted error for the three difference planes of C-M, Y-M, and K-M, is reduced compared to that of the predicted error for the three planes of CYK. In other words, in the distribution of the predicted error of the three difference planes of C-M, Y-M, and K-M, unevenness is generated toward smaller integers, and therefore, compression efficiency by the Golomb-Rice coding will be increased. Because of the above, the compression efficiency of the special lossless compression is high compared to that of the JPEG-LS compression. There is no more difference between the special lossless compression and the JPEG-LS compression except for the above-described points, and therefore, a strong correlation will appear between sizes of image data after performing compression on the same image data.

The reason that a compression method different from that of the image forming apparatus 130 is used even though the same lossless compression is used is that the characteristics of the compression required by the external RIP controller are different from those of the compression required by the image forming apparatus. First, in the case of the external RIP controller, there exists a use in which a number of print jobs are received from a plurality of client PCs. Because of this, it is required to hold compressed image data and to supply print image data to the image forming apparatus in order. In other words, it is premised that a large capacity of compressed image data is stored in a large capacity storage area (e.g., HDD or the like). Because of this, the printing speed as a printing system is affected by the reading speed from the HDD at the time of reading compressed image data. In other words, the smaller the size of image data after compression, the more advantage in the printing speed. Consequently, a compression method with a high compression ratio is required for the external RIP controller. In contrast to this, for the image forming apparatus, a compression method that does not sacrifice the printing speed is required. Specifically, a compression method capable of performing compression/decompression processing at high speed is required. Explanation is given by taking the two kinds of the special lossless compression and the JPEG-LS compression as examples. In the case of the special lossless compression, the compression ratio is relatively high, but it is necessary to decompress each plane of C-M, Y-M, and K-M, and therefore, the data of the M plane is necessary to decompress these planes. Because of this, the special lossless compression has a drawback in the processing speed because the calculation processing is complicated and it is difficult to perform parallel processing for each plane. In contrast to this, in the JPEG-LS compression, the compression ratio is relatively low, but it is possible to decompress each plane of CMYK independently and the calculation processing may be simple compared to that of the special lossless compression. In fact, by performing parallel processing on each plane of CMYK, it is possible to reduce the processing time to ¼. For the above reasons, the image forming apparatus 130 and the external RIP controller 120 adopt different compression methods in accordance with the characteristics required by each.

The storing processing unit 121 performs processing to store image data or the like compressed by the compression/decompression unit 123 and various kinds of data and information in the HDD.

Subsequently, the software module of the client PC 110 is explained.

The client PC 110 includes a UI processing unit 111, a job generation unit 112, and a transmission/reception processing unit 113.

The UI (User Interface) processing unit 111 is a processing unit configured to manage a display unit and an input/output device (neither of them is shown), such as a keyboard and a mouse. For example, the UI processing unit 111 performs processing to display an operation screen on which for a user to specify a document to be printed etc. on the display unit and processing to manage the input operation of the keyboard and mouse to reflect the input operation on the operation screen on the display unit. Further, the UI processing unit 111 also performs processing or the like to receive instructions to perform printing from a user via the operation screen and to give instructions to generate a print job to the job generation unit 112.

The job generation unit 112 performs processing to generate a print job (PDL data in the present embodiment) in accordance with instructions from the UI processing unit 111.

The transmission/reception processing unit 113 performs processing related to transmission and reception of data with the external RIP controller 120.

FIG. 3 is a graph representing a correlation between the sizes of image data after the special lossless compression and the JPEG-LS compression have been performed on a plurality of kinds of RAW images for test. In FIG. 3, the horizontal axis represents the size of the image data after the special lossless compression that is performed in the external RIP controller 120 has been performed, and the vertical axis represents the size of the image data after the JPEG-LS compression that is performed in the image forming apparatus 130 has been performed.

As is obvious from FIG. 3, there is a correlation with respect to the size of the image data after the compression between the special lossless compression and the JPEG-LS compression. This means that it is possible to predict, to a certain extent, the size of the image data after the JPEG-LS compression has been performed in the image forming apparatus 130 from the size of the image data after the special lossless compression has been performed on the external RIP controller 120 side. For example, from the graph in FIG. 3, it is known that there is a tendency for the size of the image data after the JPEG-LS compression has been performed to exceed 80 MB in the case where the size of the image data after the special lossless compression has been performed exceeds 75 MB. In other words, there is a correlation with respect to the size of the image data after the compression between the compression method in the external RIP controller 120 and the compression method in the image forming apparatus 130.

On the assumption such as this, in the present embodiment, the size of the image data in the case where the compression is performed in the image forming apparatus 130 is predicted based on the size of the compressed image data has been performed in the external RIP controller 120. Specifically, the external RIP controller 120 gives instructions to the image forming apparatus 130 to determine whether the JPEG-LS compression should be performed or the JPEG compression should be performed based on the image data size after the special lossless compression has been performed in the external RIP controller 120. Due to this, it is possible to perform the compression on the received RAW image data by a more favorable method (method by which it is predicted that the data can be stored in the primary buffer with a less deterioration of image quality) in the image forming apparatus 130, and therefore, it is possible to reduce the probability of retransmission of the RAW image data.

First, generation processing of a print job in the client PC 110 according to the present embodiment is explained.

A user specifies a document (electronic data) to be printed and gives instructions to perform printing from the client PC 110 by using a keyboard or mouse. The user's instructions to perform printing are received by the UI processing unit 111 of the client PC 110. Then, the UI processing unit 111 gives instructions to the job generation unit 112 to generate a print job for the document specified by the user. Upon receipt of the instructions from the UI processing unit 111, the job generation unit 112 generates PDL data (drawing data described in the PDL language, such as PostScript) as a print job. Subsequently, the job generation unit 112 instructs the transmission/reception processing unit 113 to transmit the print job (here, print job=PDL data) to the external RIP controller 120. Upon receipt of the instructions, the transmission/reception processing unit 113 transmits the print job to the external RIP controller 120.

Next, processing in the external RIP controller 120 having received a print job according to the present embodiment is explained.

Figure 4B:
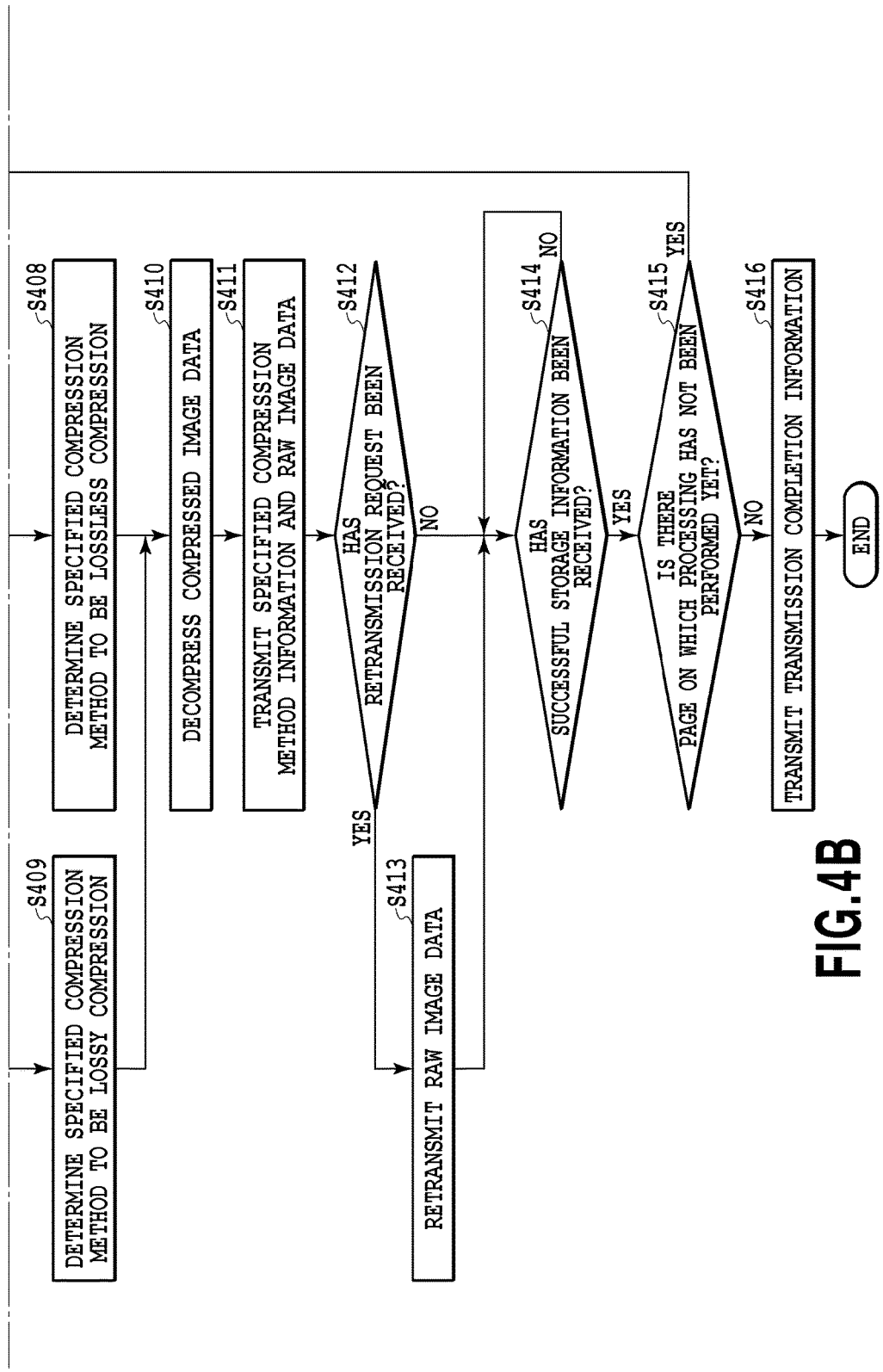

FIGS. 4A and 4B are flowcharts showing a flow of the processing in the external RIP controller 120 according to the present embodiment.

At step 401, whether or not a print job has been received from the client PC 110 is determined. In the case where a print job has been received, the processing proceeds to step S402. On the other hand, in the case where no print job has been received, monitoring of whether a print job has been received is continued.

At step 402, information representing the processing to transmit RAW image data or the like corresponding to the print job received at step 401 is started (hereinafter, transmission start information) is transmitted to the image forming apparatus 130 by the transmission/reception processing unit 122.

At step 403, rasterization is performed on the PDL data included in the print job by the RIP unit 124, and RAW image data is generated for each page.

At step 404, the special lossless compression is performed by the compression/decompression unit 123 on the RAW image data of a processing-target page of the RAW image data generated at step 403.

At step 405, the image data on which the special lossless compression has been performed is stored temporarily by the storing processing unit 121 and at the same time, information on the size of the image data on which the special lossless compression has been performed is acquired from the storing processing unit 121.

At step 406, a threshold value α is determined which is used to determine whether the lossless compression should be specified or the lossy compression should be specified for the image forming apparatus 130. Here, it is assumed that the capacity of the primary buffer of the image forming apparatus 130 is 80 MB. In this case, on a condition that the image data size after the special lossless compression has been performed exceeds 75 MB, the image data size after the lossless compression (JPEG-LS) in the image forming apparatus 130 will exceed 80 MB, and a situation is predicted in which the image data cannot be stored in the primary buffer (see the graph in FIG. 3 described previously). Consequently, the threshold value α is determined to be 75 MB in this case. It may be possible to perform the determination by, for example, adding in advance information on the capacity of the primary buffer of the image forming apparatus 130 to the print job and by referring to the capacity information included in the print job that is sent. Further, in the case where the capacity of the primary buffer of the image forming apparatus 130 is known in advance, it may also be possible to determine and hold the threshold value α in advance and then to acquire the threshold value α.

At step 407, by comparing the image data size after the special lossless compression acquired at step 405 with the above-described threshold value α (here, 75 MB), whether the image data size after the special lossless compression exceeds the threshold value α is determined. In the case where the results of the determination indicate that the image data size after the special lossless compression is equal to or less than threshold value α, the processing proceeds to step S408. On the other hand, in the case where the image data size after the special lossless compression is greater than the threshold value α, the processing proceeds to step S409.

At step 408, the compression method to be specified for the image forming apparatus 130 (hereinafter, the specified compression method) as a recommended compression method is determined to be the lossless compression (here, JPEG-LS).

At step 409, the specified compression method is determined to be the lossy compression (here, JPEG).

At step 410, the image data on which the special lossless compression has been performed is read by the storing processing unit 121, and the compressed image data that is read is decompressed by the compression/decompression unit 123.

At step 411, the information on the specified compression method determined at step 408 or 409 and the RAW image data corresponding to one page decompressed by the compression/decompression unit 123 are transmitted to the image forming apparatus 130 by the transmission/reception processing unit 122. Here, the reason the image data on which the compression processing has been performed in the external RIP controller 120 is not transmitted to the image forming apparatus 130 is explained. In the case where the image data compressed by the external RIP controller 120 is delivered to the image forming apparatus 130 as it is, it is necessary for the compression/decompression unit 133 within the image forming apparatus 130 to have the same CODEC as that of the compression/decompression unit 123 within the external RIP controller 120. However, in the case where image transfer between the external RIP controller 120 and the image forming apparatus 130 is performed by using a RAW image, it is not necessary for the external RIP controller 120 and the image forming apparatus 130 to hold the same CODEC. Due to this, it is made possible to develop the image forming apparatus 130 and the external RIP controller 120 independently of each other, and therefore, it is possible for each unit to evolve independently. In other words, by performing transmission and reception of image data between the image forming apparatus 130 and the external RIP controller 120 by using a RAW image, it is made easier to provide the products into which new technology has been supplied respectively on the market. Such a system configuration will be an architecture capable of being superior to others from the viewpoint of the ability to compete in the market. For the above reason, in the present embodiment, the external RIP controller 120 transmits the RAW image data obtained by decompressing the image data on which the special lossless compression has been performed to the image forming apparatus 130 in place of the image data itself.

At step 412, whether or not a request to retransmit RAW image data has been received from the image forming apparatus 130 is determined. In the case where no retransmission request has been received, the processing proceeds to step 414. On the other hand, in the case where a retransmission request has been received, the processing proceeds to step 413.

At step 413, the RAW image data corresponding to one page, which has been transmitted at step 411, is transmitted again to the image forming apparatus 130 by the transmission/reception processing unit 122.

At step 414, whether information representing storage of RAW image data into the primary buffer has succeeded without any problem (hereinafter, successful storage information) has been received from the image forming apparatus 130 is determined. In the case where the successful storage information has been received, the processing proceeds to step 415. On the other hand, in the case where the successful storage information has not been received, monitoring of whether the successful storage information has been received is continued.

At step 415, whether or not the processing has been completed for the image data of all the pages related to the print job is determined. In the case where there is a page on which the processing has not been performed yet, the processing returns to step 404, and the next page is taken to be the processing-target page and the processing is continued. On the other hand, in the case where the processing has been completed for all the pages, the processing proceeds to step 416.

At step 416, information representing the processing to transmit the RAW image data of all the pages related to the print job has been completed (hereinafter, transmission completion information) is transmitted to the image forming apparatus 130 by the transmission/reception processing unit 122 and the present processing is terminated.

The above is the contents of the processing in the external RIP controller 120 according to the present embodiment.

Next, processing in the image forming apparatus 130 having received RAW image data for which the compression method is specified according to the present embodiment is explained.

Figure 5:
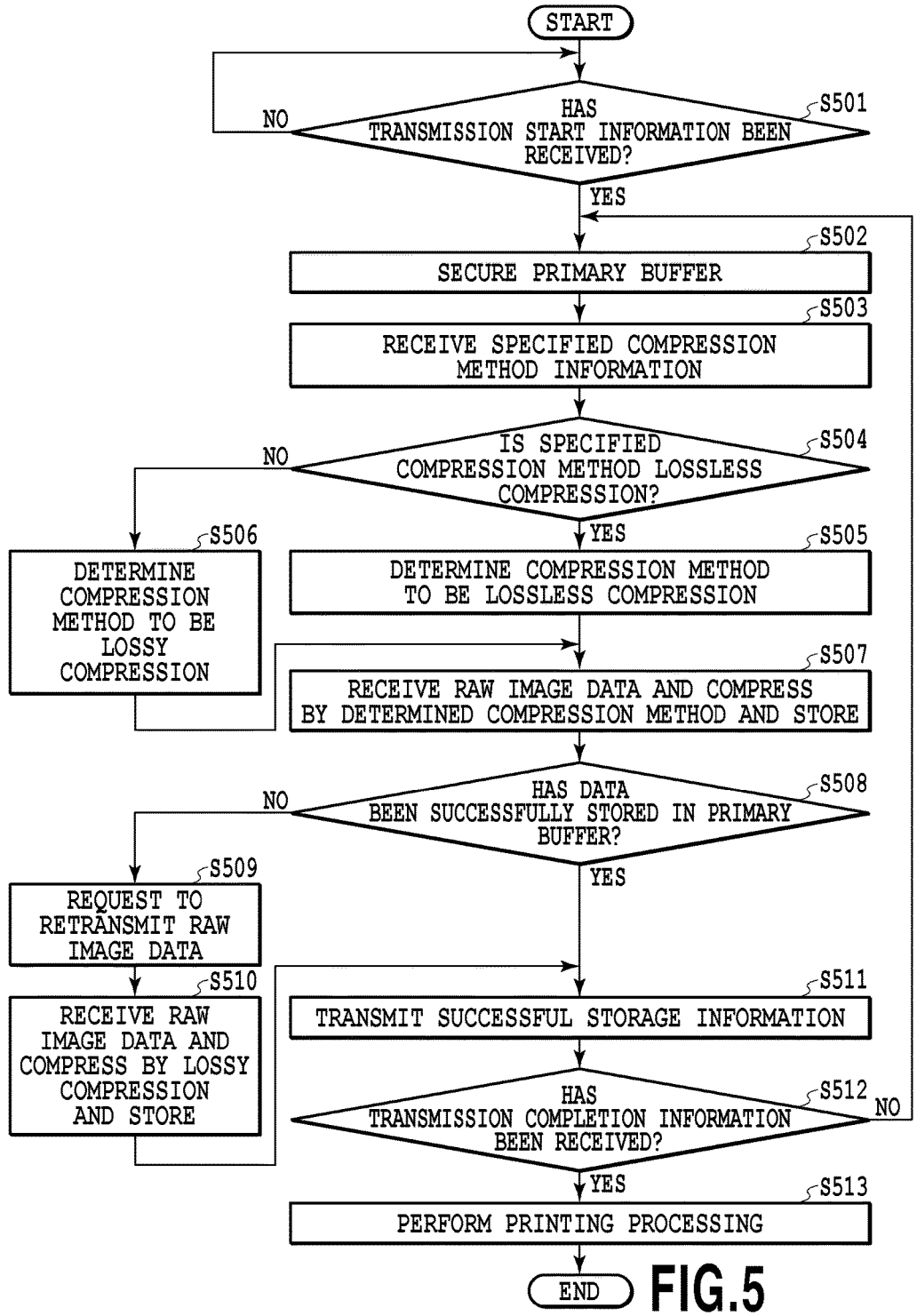
FIG. 5 is a flowchart showing a flow of processing in an image forming apparatus according to the first embodiment.

FIG. 5 is a flowchart showing a flow of the processing in the image forming apparatus 130 according to the present embodiment.

At step 501, whether or not the above-described transmission start information has been received from the external RIP controller 120 is determined. In the case where the transmission start information has been received, the processing proceeds to step 502. On the other hand, in the case where the transmission start information has not been received, monitoring of whether the transmission start information has been received is continued.

At step 502, the primary buffer for storing image data corresponding to one page is secured on the RAM by the storing processing unit 131. In the present embodiment, 80 MB is secured as described previously.

At step 503, the specified compression method information is received by the transmission/reception processing unit 122.

At step 504, whether or not the compression method specified by the received specified compression method information is the lossless compression is determined. In the case where the lossless compression (JPEG-LS) is specified, the processing proceeds to step 505. On the other hand, in the case where the lossless compression is not specified (i.e., the lossy compression (JPEG) is specified), the processing proceeds to step 506.

At step 505, the compression method of the RAW image data transmitted from the RIP controller 120 is determined to be the lossless compression (JPEG-LS).

At step 506, the compression method of the RAW image data transmitted from the RIP controller 120 is determined to be the lossy compression (JPEG).

At step 507, the RAW image data is received from the external RIP controller 120 and the compression processing using the CODEC of the compression method determined at step 505 or 506 (i.e., specified by the external RIP controller 120) is performed by the compression/decompression unit 133. Then, the compressed RAW image data is stored sequentially in the primary buffer.

At step 508, whether the RAW image data received from the external RIP controller 120 has been compressed and stored in the primary buffer without any problem is determined by the storing processing unit 131. In the case where the RAW image data after the compression has been stored in the primary buffer without causing an overflow, the processing proceeds to step 511. On the other hand, in the case where the RAW image data after the compression has overflowed and the storage into the primary buffer has failed, the processing proceeds to step 509.

At step 509, the retransmission request for the RAW image data is transmitted to the external RIP controller 120 by the transmission/reception processing unit 132. At the same time, the primary buffer is cleared by the storing processing unit 131.

At step 510, the RAW image data is received again from the external RIP controller 120, the compression processing using the CODEC of the lossy compression (JPEG) is performed by the compression/decompression unit 133, and the compressed RAW image data is stored in the primary buffer.

At step 511, the successful storage information, which is information representing the storage of the RAW image data into the primary buffer has succeeded without any problem, is transmitted to the external RIP controller 120 by the transmission/reception processing unit 132.

At step 512, whether the above-described transmission completion information has been received from the external RIP controller 120 is determined. In the case where the transmission completion information has been received, the processing proceeds to step 513. On the other hand, in the case where the transmission completion information has not been received, the RAW image data of the next page will be sent, and therefore, the processing returns to step 502 and the processing of the next page is continued.

At step 513, based on the image data that has been compressed and stored, the printing processing is performed. Specifically, first, the compressed and stored image data is decompressed by the compression/decompression unit 133 and the RAW image data is generated. After the decompression into the RAW image data is completed, the RAW image data is sent to the printing processing unit 134 by the storing processing unit 131 and the RAW image is formed on a sheet.

In the present embodiment, in the case where compression by the lossy compression is performed, the situation in which the data cannot be stored in the primary buffer is not supposed. In the case where such a situation should occur, it is sufficient to perform, for example, error processing for this.

The above is the contents of the processing in the image forming apparatus 130 having received the RAW image data for which the compression method is specified according to the present embodiment.

According to the present embodiment, it is possible to suppress the occurrence of the situation to the full extent possible in which image data is retransmitted from the external RIP controller while taking into consideration the deterioration of image quality.

[Second Embodiment]

Next, an aspect is explained as a second embodiment in which compression can be performed by three kinds of compression methods in the image forming apparatus 130 and the size of the primary buffer differs depending on the size of a printing medium on which printing is performed. Explanation of the contents in common to those of the first embodiment (basic configuration of the production printing system 100 or the like) is omitted or simplified and in the following, different points are explained mainly.

In the present embodiment, as in the first embodiment, it is assumed that the external RIP controller 120 performs the special lossless compression based on JPEG-LS on the RAW image data. Further, it is also assumed that the external RIP controller 120 specifies one of three kinds of compression methods (one kind of lossless compression and two kinds of lossy compression) for the image forming apparatus 130 in accordance with the size of the image data after the special lossless compression has been performed. It is also assumed that the JPEG-LS compression is adopted as the lossless compression in the image forming apparatus 130, hybrid compression of JPEG-LS and JPEG is adopted as the first lossy compression of the two kinds of lossy compression, and the JPEG compression is adopted as the second lossy compression, respectively.

Here, the hybrid compression is explained. The hybrid compression is a method for compressing a non-text area, such as a photo, with a high compression ratio by performing the JPEG compression while keeping high quality of a text area by performing the JPEG-LS compression on the text area, and is a compression method combining the lossless compression and the lossy compression. By this hybrid compression, it is possible to reduce the data size after the compression while preventing a deterioration of the apparent image quality. The present embodiment premises that there is a correlation between the data size after the compression by the hybrid compression and the data size after the compression by the special lossless compression based on JPEG-LS. In the case of the hybrid compression, it is assumed that there is a tendency for the data size after the hybrid compression has been performed to exceed 80 MB on a condition that the data size after the special lossless compression has been performed exceeds 110 MB.

Then, it is assumed that the capacity of the primary buffer for holding the RAW image data in the image forming apparatus 130 differs depending on the size of a printing medium (sheet) on which printing is performed and as an example, the capacity is 80 MB in the case of A4 size and 40 MB in the case of A5 size.

First, generation processing of a print job in the client PC 110, which is the premise of the present embodiment, is explained briefly.

A user specifies a document (electronic data) to be printed and the size of a printing medium to be used for the printing and gives instructions to perform printing from the client PC 110 by using a keyboard or mouse. Here, it is assumed that a user specifies A4 as the size of the printing medium (sheet) on which printing is performed. Upon receipt of the printing instructions, the UI processing unit 111 gives instructions to generate a print job for the document specified by the user to the job generation unit 112. The job generation unit 112 generates print setting information including PDL data and information for specifying the size of the printing medium (hereinafter, media size information) to be used as a print job. Then, the generated print job (in the present embodiment, print job=PDL data+print setting information) is transmitted to the external RIP controller 120 by the transmission/reception processing unit 113.

Next, processing in the external RIP controller 120 having received a print job according to the present embodiment is explained.

Figure 6B:
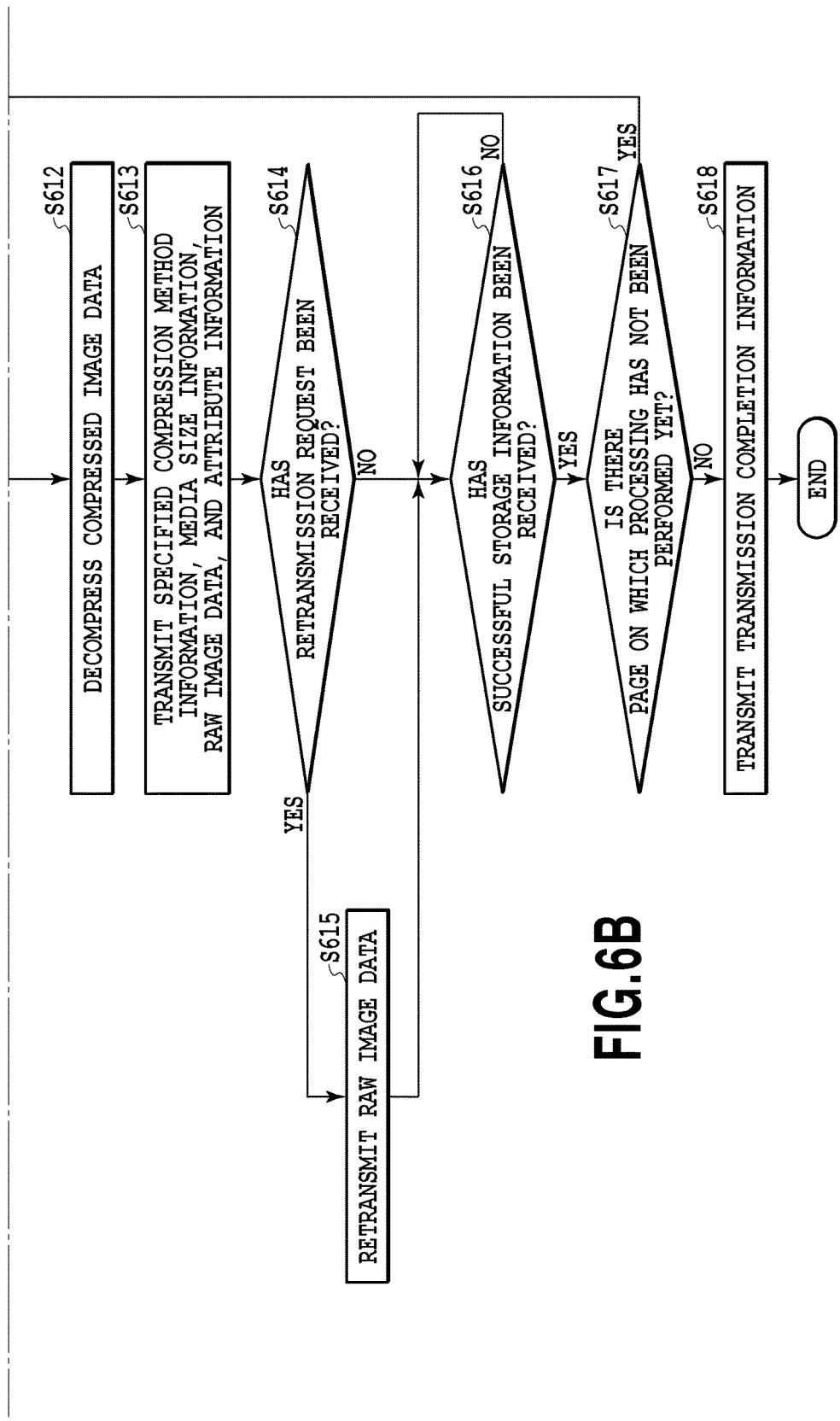

FIGS. 6A and 6B are flowcharts showing a flow of the processing in the external RIP controller 120 according to the present embodiment.

Upon receipt of a print job (PDL data+print setting information) from the client PC 110 (Yes at step 601), the transmission start information is transmitted to the image forming apparatus 130 by the transmission/reception processing unit 122 (step 602).

At step 603, the RAW image data (for each page) is generated from the PDL data within the print job by the RIP unit 124 and at the same time, attribute information is generated by the compression/decompression unit 123. Here, the attribute information is information for specifying the kind of area to which each pixel of the RAW image belongs, and in the present embodiment, is information for specifying one of the text area and the non-text area to which each pixel belongs.

At step 604, the special lossless compression is performed by the compression/decompression unit 123 on the RAW image data of the processing-target page of the generated RAW image data.

At step 605, the attribute information generated at step 603 and the image data on which the special lossless compression has been performed at step 604 are stored by the storing processing unit 121, and at the same time, the information on the image data size after the compression is acquired.

At step 606, two threshold values (threshold value $\alpha$ and threshold value $\beta$) used to determine which kind of compression method should be specified for the image forming apparatus 130 are determined. Here, the threshold value $\alpha$ is a threshold value used to determine whether the lossless compression should be specified or the lossy compression should be specified as in the first embodiment. Then, the threshold value $\beta$ is a threshold value used to determine, among the lossy compression, whether the first lossy compression (hybrid compression) aiming at the coexistence of both the image quality and the compression ratio or the second lossy compression (JPEG compression) that gives priority to the compression ratio should be specified. Here, the threshold value $\alpha$ and the threshold value $\beta$ are determined based on the media size information included in the print job received at step 601. For example, in the case where the size of the printing medium specified by the media size information is A4, the threshold value $\alpha$ is determined to be 75 MB (see FIG. 3 described previously) and the threshold value β is determined to be 110 MB based on the premise described previously, and so on.

At step 607, whether the image data size after the special lossless compression exceeds the threshold value α is determined based on the information on the image data size after the compression acquired at step 605 and the above-described threshold value α (75 MB). In the case where the results of the determination indicate that the image data size after the compression is equal to or less than the threshold value α, the processing proceeds to step 608. On the other hand, in the case where the image data size after the compression is greater than the threshold value α, the processing proceeds to step 609.

At step 608, the specified compression method is determined to be the lossless compression (here, JPEG-LS).

At step 609, whether the image data size after the special lossless compression exceeds the threshold value β is determined based on the information on the image data size after the special lossless compression acquired at step 605 and the above-described threshold value β (110 MB). In the case where the results of the determination indicate that the image data size after the compression is equal to or less than the threshold value β, the processing proceeds to step 610. On the other hand, in the case where the image data size after the compression is greater than the threshold value β, the processing proceeds to step 611.

At step 610, the specified compression method is determined to be the first lossy compression (hybrid compression).

At step 611, the specified compression method is determined to be the second lossy compression (JPEG compression).

At step 612, the image data on which the special lossless compression has been performed is read by the storing processing unit 121, and the compressed image data that is read is decompressed by the compression/decompression unit 123.

At step 613, the above-described media size information, the information on the determined specified compression method, and further, the RAW image data corresponding to one page, which has been decompressed by the compression/decompression unit 123, and the above-described attribute information are transmitted sequentially to the image forming apparatus 130 by the transmission/reception processing unit 122.

The subsequent step 614 to step 618 correspond to step 412 to step 416 in the flow in FIG. 4B according to the first embodiment and they are quite the same, and therefore, detailed explanation of these steps is omitted.

Next, processing in the image forming apparatus 130 having received the RAW image data for which the compression method is specified according to the present embodiment is explained.

Figure 7B:
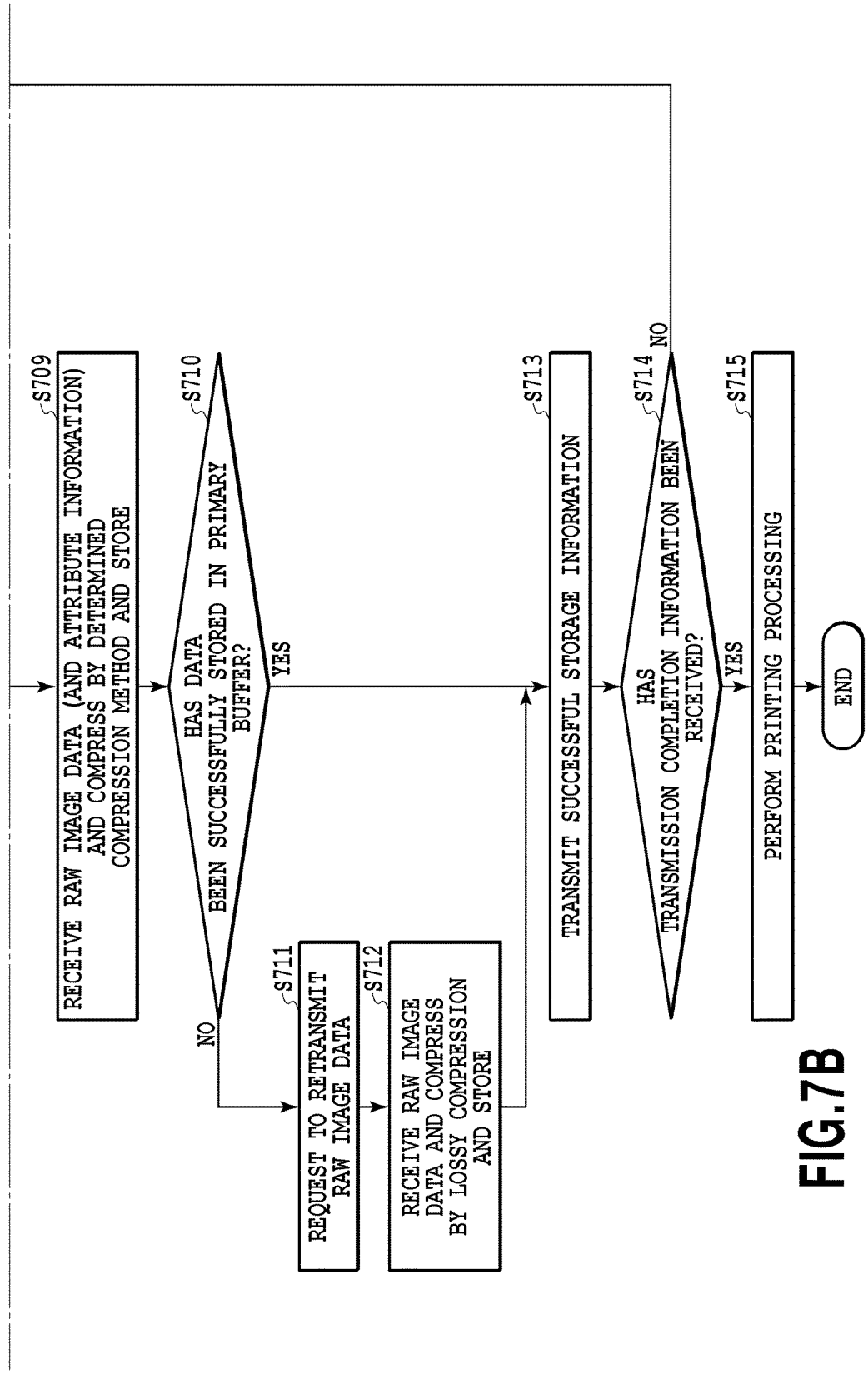

FIGS. 7A and 7B are flowcharts showing a flow of the processing in the image forming apparatus according to the present embodiment.

Upon receipt of the transmission start information (step 701), the media size information is received by the transmission/reception processing unit 132 at step 702.

At step 703, the primary buffer in accordance with the size of a sheet on which printing is to be performed following the received media size information is secured by the storing processing unit 131. For example, in the case where the size of the sheet specified by the media size information is A4, the primary buffer of 80 MB is secured.

At step 704, the above-described information for specifying the compression method is received by the transmission/reception processing unit 132.

At step 705, whether the compression method specified by the received information for specifying the compression method is the lossless compression (JPEG-LS) or the lossy compression is determined and in the case of the lossy compression, whether the compression method is the first lossy compression or the second lossy compression is determined. In the case where the lossless compression (JPEG-LS) is specified, the processing proceeds to step 705. On the other hand, in the case where the compression method is the lossy compression and the first lossy compression (hybrid compression) is specified, the processing proceeds to step 706 and in the case where the second lossy compression (JPEG) is specified, the processing proceeds to step 707.

At step 706, the compression method of the RAW image data is determined to be the lossless compression (JPEG-LS).

At step 707, the compression method of the RAW image data is determined to be the first lossy compression (hybrid).

At step 708, the compression method of the RAW image data is determined to be the second lossy compression (JPEG).

At step 709, the RAW image data is received from the external RIP controller 120 and the compression processing using the CODEC of the compression method determined at one of steps 706 to 708 (i.e., specified by the external RIP controller 120) is performed by the compression/decompression unit 133. In the case of the hybrid compression, which is the first lossy compression, the attribute information that has been received at the same time is referred to and different compression processing is performed on the text area and on the non-text area. Then, the compressed RAW image data is stored sequentially in the primary buffer.

After that, whether the RAW image data has been compressed and stored in the primary buffer without any problem is determined (step 710) and in the case where the storage into the primary buffer has succeeded, the processing proceeds to step 713 and in the case where the storage into the primary buffer has failed, the processing proceeds to step 711.

At step 711, the retransmission request for the RAW image data is transmitted to the external RIP controller 120 by the transmission/reception processing unit 132. At the same time, the primary buffer is cleared by the storing processing unit 131.

At step 712, the RAW image data is received again from the external RIP controller 120 and the compression processing using the CODEC of the lossy compression is performed. As the lossy compression at this time, for example, the second lossy compression with a higher compression ratio is applied because priority is given to the processing efficiency. Because of this, at the time of the retransmission of data at step 615 described previously, the RIP controller 120 retransmits only the RAW image data but does not retransmit the attribute information. However, in the case where the compression method specified first is the lossless compression and the storage into the primary buffer has failed, it may also be possible to try the first lossy compression with a relatively low compression ratio for the retransmitted RAW image data and on a condition that the data cannot be stored, to request retransmission for the second time and to perform the second lossy compression with a higher compression ratio. At the time of the first data retransmission (step 615) in the case where the processing is performed stepwise as described above, the attribute information is also retransmitted together with the RAW image data as a result.

The processing at each of step 713 to step 715 corresponds to that at each of step 511 to step 513 in the flow in FIG. 5 of the first embodiment and they are quite the same, and therefore, explanation is omitted.

The above is the contents of the processing in the image forming apparatus 130 having received the RAW image data for which the compression method is specified.

[Third Embodiment]

Next, an aspect is explained as a third embodiment in which printing of a plurality of sets of the same document is specified in a print job. Explanation of the contents in common to those of the first embodiment and the second embodiment is omitted or simplified and in the following, different points are explained mainly.

Figure 8:
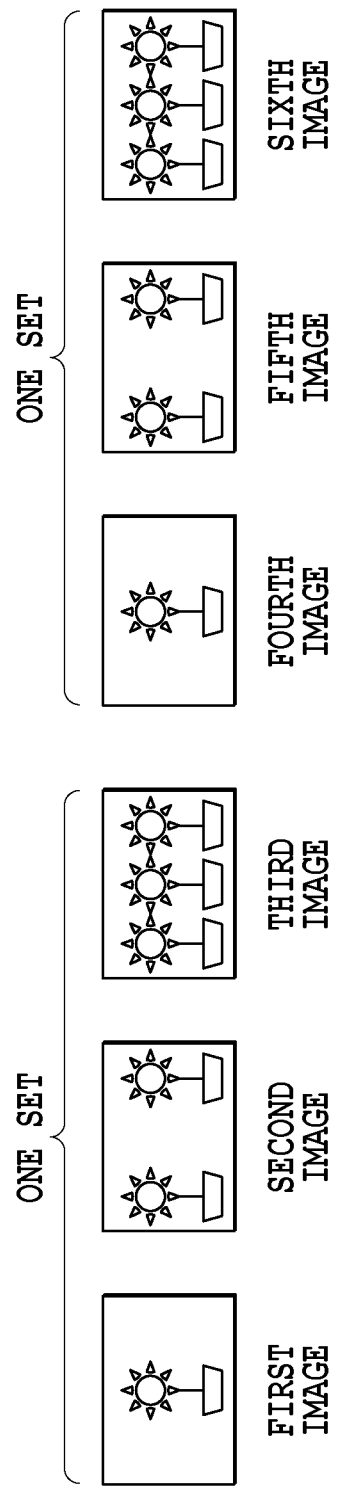
FIG. 8 is a diagram showing a RAW image that is transmitted from a RIP controller in the case of printing of a plurality of sets.

FIG. 8 is a diagram showing RAW images that are transmitted from the RIP controller in the case where two sets of a document including three pages in total are printed as an example of printing of a plurality of sets.

As shown in FIG. 8, in the case where a user gives instruction to perform printing of a plurality of copes (here, two sets) of a document including three pages in total from the client PC 110, the external RIP controller 120 transmits RAW image data corresponding to six pages in total to the image forming apparatus 130. In this case, the first image and the fourth image, the second image and the fifth image, and the third image and the sixth image are the same RAW image, respectively. In this case, at the point in time the RAW image data for the second set is transmitted, the specified compression method is already known. Because of this, in the present embodiment, the second or subsequent transmission makes use of the information on the compression method determined at the time of the first transmission in the case where the same image data is transmitted a plurality of times. In the following, the present embodiment is explained based on the second embodiment.

First, the processing in the client PC 110, which is the premise of the present embodiment, is explained briefly.

A user gives instructions to perform printing after specifying a document to be printed, the size of a printing medium to be used, and the number of sets to be printed by using a keyboard or mouse in the client PC 110. Here, it is assumed that A4 is specified as the size of a sheet, which is a printing medium to be used for printing, and two sets are specified as the number of sets to be printed. Then, a print job for the document specified by the user is generated by the job generation unit 112. Specifically, from the document specified by the user, PDL data is generated and further, print setting information including information on the size of a sheet on which printing is to be performed and the number of sets to be printed is generated. The generated print job (print job=PDL data+print setting information) is transmitted to the external RIP controller 120 by the transmission/reception processing unit 113.

Next, processing in the external RIP controller 120 having received the above-described print job is explained.

Figure 9B:
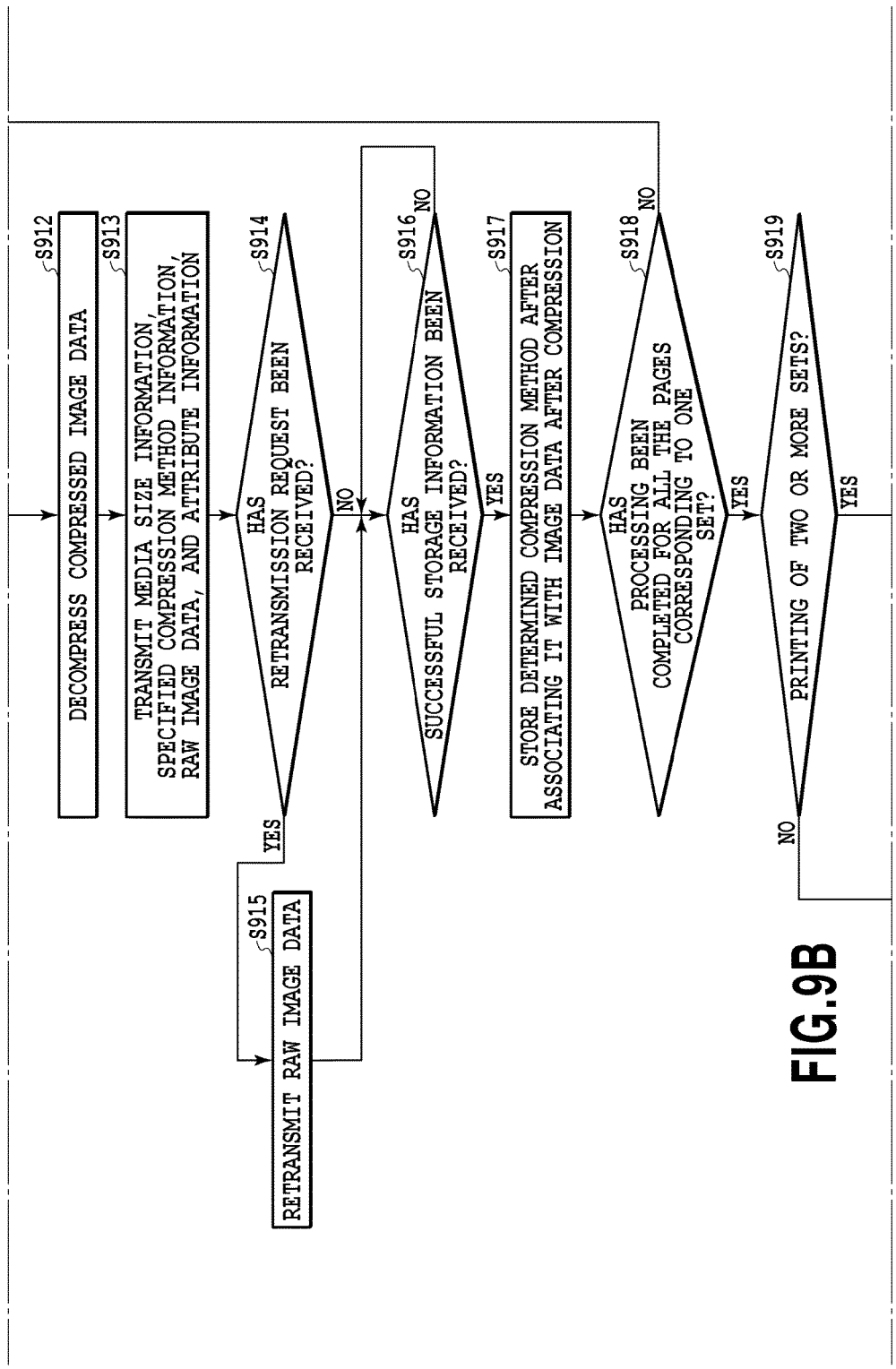
Figure 9C:
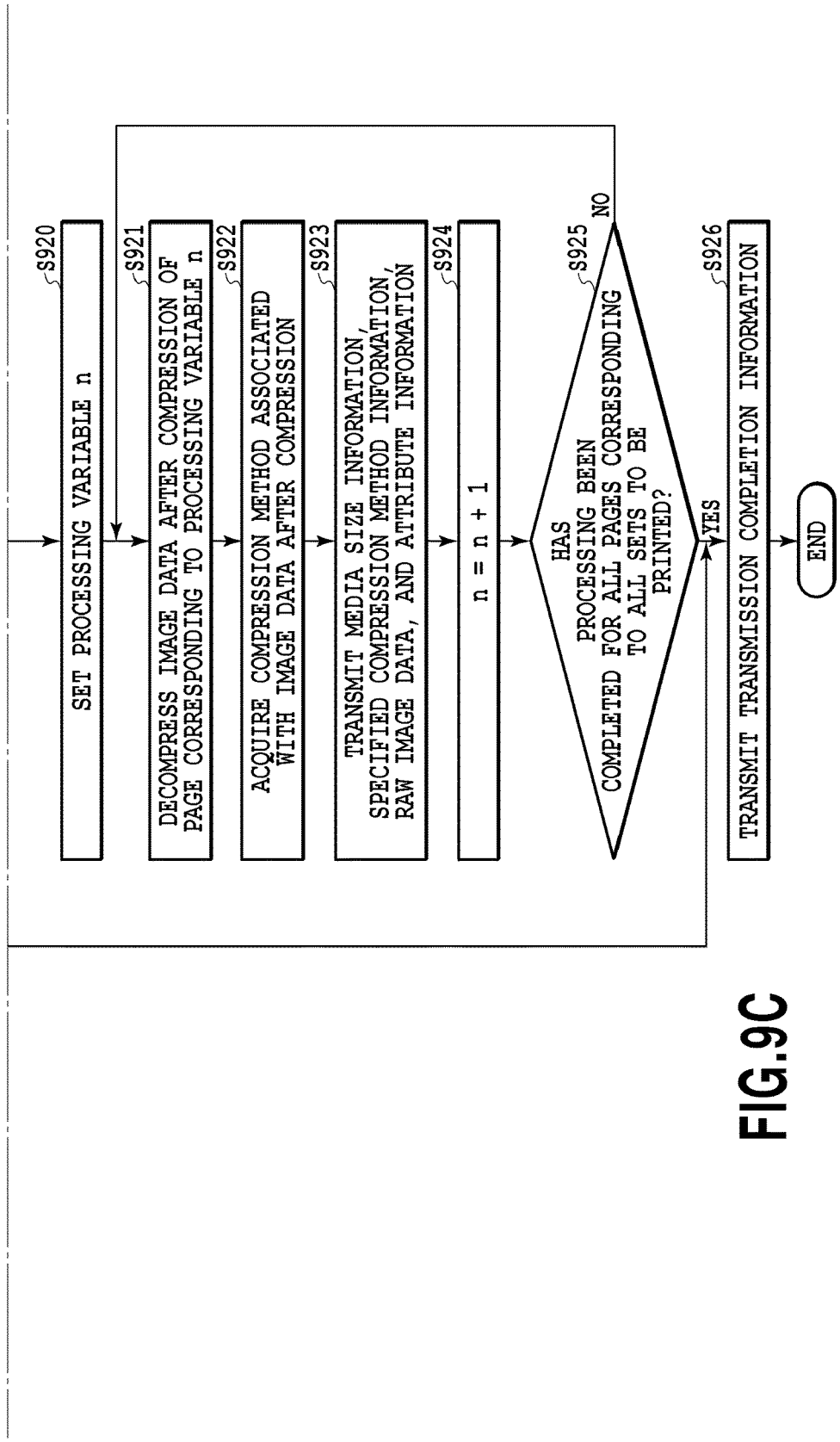

FIGS. 9A to 9C are flowcharts showing a flow of the processing in the external RIP controller according to the present embodiment.

The processing at each of step 901 to step 916 corresponds to that at each of step 601 to step 616 in the flow in FIG. 6B of the second embodiment and they are quite the same, and therefore, explanation is omitted.

At step 917, the specified compression method that has been determined and the target image data are associated with each other and stored in the HDD by the storing processing unit 121. Specifically, the information on the specified compression method determined at one of steps 908, 910, and 911 is stored after being associated with the image data of a page to which the compression method is applied. However, in the case where the retransmission request has been received (Yes at step 914) and the RAW image data has been retransmitted (step 915), the image data is stored after being associated with a compression method (e.g., JPEG) with a compression ratio higher than that to be performed on the RAW image data after being received again by the image forming apparatus 130 side.

At step 918, whether the processing has been completed for all the pages (total number of pages corresponding to one set, three pages in the example in FIG. 8) of the document to be printed. In the case where there is a page on which the processing has not been performed yet, the processing returns to step 904, and the next page is taken to be the processing-target page and the processing is continued. On the other hand, in the case where the processing has been performed for all the pages, the processing proceeds to step 919.

At step 919, after the print setting information within the received print job is analyzed, whether the specified number of sets to be printed is two or more is determined. In the case where printing of two or more sets is specified, the processing proceeds to step 920. On the other hand, in the case where printing of only one set is specified, the processing proceeds to step 926.

At step 920, a processing variable n is set. Here, the processing variable n is a variable for the transmission of the RAW image data for the second and subsequent sets and the information on the corresponding specified compression method without performing the previously-described threshold value comparison processing in the loop processing at the subsequent step 921 to step 925. For example, in the case where the total number of pages of a document to be printed is taken to be P, the processing variable n is expressed by expression (1) below.

$$n=1 \times P+1 \qquad \text{expression(1)}$$

In the example in FIG. 8 described above, P="3", and therefore, "4" is set to the processing variable n in this case.

At step 921, the compressed image data of the pth page corresponding to the current processing variable n is read by the storing processing unit 121, and is decompressed by the compression/decompression unit 123. Here, the pth page is found by expression (2) below.

$$p=\{(n-1)\mathrm{Mod}P\}+1 \qquad \text{expression(2)}$$

From expression (2) described above, for example, the pth page corresponding to the processing variable n="4" is the first page.

At step 922, the information on the specified compression method that is associate with the image data of the pth page is read and acquired from the HDD by the storing processing unit 121.

At step 923, the media size information, the information on the specified compression method acquired at step 922, the RAW image data corresponding to one page decompressed by the compression/decompression unit 123, and the above-described attribute information are sequentially transmitted to the image forming apparatus 130 by the transmission/reception processing unit 122.

At step 924, the processing variable n is incremented (+1).

At step 925, whether the processing has been completed for all the pages corresponding to the specified number of sets to be printed is determined. Specifically, whether the value of the processing variable n satisfies conditional expression (3) below is determined and in the case where conditional expression (3) is satisfied, it is determined that there is a page on which the processing has not been performed yet and in the case where conditional expression (3) is not satisfied, it is determined that there is not a page on which the processing has not been performed yet (processing has been completed for all the pages).

$$1 \times P < n <= C \times P \qquad \text{expression(3)}$$

In expression (3) described above, P denotes the number of pages and C denotes the number of sets to be printed, respectively. In the example in FIG. 8 described above, P="3" and C="2", and therefore, until the value of the processing variable reaches "7", i.e., in the case where the value is equal to or less than "6", it is determined that there is a page on which the processing has not been performed yet. In the case where there is a page on which the processing has not been performed yet, the processing returns to step 921, and the processing is continued by taking the next page to be the target. On the other hand, in the case where the processing has been completed for all the pages corresponding to the specified number of sets to be printed, the processing proceeds to step 926.

At step 926, the transmission completion information is transmitted to the image forming apparatus 130 by the transmission/reception processing unit 122 and the present processing is terminated.

The above is the contents of the processing in the external RIP controller 120 according to the present embodiment.

The processing in the image forming apparatus 130 is the same as that of the second embodiment, and therefore, explanation is omitted.

According to the present embodiment, it is possible to implement process ing with higher efficiency in the case where printing of a plurality of sets of the same document is specified.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to prevent a delay in the start of printing processing resulting from the above-described problem of retransmission of image data. Further, as a result of this, it is also possible to prevent a reduction in the printing performance resulting from the repetition of retransmission of image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-211748, filed Oct. 16, 2014, which is hereby incorporated by reference wherein in its entirety.

What is claimed is:

1. An image forming system including an information processing apparatus and an image forming apparatus connected with the information processing apparatus, wherein the information processing apparatus comprises:
at least one processor; and at least one memory storing instructions, when executed by the processor, causing the apparatus to function as;
a first compression unit configured to compress image data and to store compressed image data in a first storage unit;
a first determination unit configured to determine a compression method on a basis of a data size of the compressed image data stored in the first storage unit;
a decompression unit configured to decompress the compressed image data stored in the first storage unit; and
a transmission unit configured to transmit image data decompressed by the decompression unit and information on the determined compress method, and
the image forming apparatus comprises:
at least one processor; and at least one memory storing instructions, when executed by the processor, causing the apparatus to function as;
an reception unit configured to receive the decompressed image data transmitted by the transmission unit and the information on the determined compress method transmitted by the transmission unit;
a second compression unit configured to compress the received image data using a compression method specified by the received information and to store the compressed image data in a second storage unit; and
an image forming unit configured to form an image on a basis of the compressed image data stored in the second storage unit.

2. The image forming system according to claim 1, wherein the first determination unit determines the compression method in accordance with whether or not a data size of an image data after compression is larger than a threshold value.

3. The image forming system according to claim 1, wherein the image forming apparatus further comprises:
a second determination unit configured to determine whether or not the storing into the second storage unit is successful; and a request unit configured to require the information processing apparatus to re-transmit the image data decompressed by the decompressed unit, and wherein the second compression unit of the image forming unit is further configured to receive the image data re-transmitted by the information processing apparatus, and tov compress the received image data according to a lossy compression method to store the lossy-compressed image data in the second storage unit.

4. The image forming system according to claim 1, wherein the image forming apparatus is further comprises:

a third determination unit configured to determine whether or not the storing into the second storage unit is successful; and a request unit configured to require the information processing apparatus to re-transmit the image data decompressed by the decompressed unit, and wherein the second compression unit of the image forming unit is further configured to receive the image data re-transmitted by the information processing apparatus, and to compress the received image data according to a lossy compression method, whose compression ratio is higher than the compression method determined by the second determination unit, to store the lossy-compressed image data in the second storage unit.

* * * * *